UNITED STATES PATENT OFFICE.

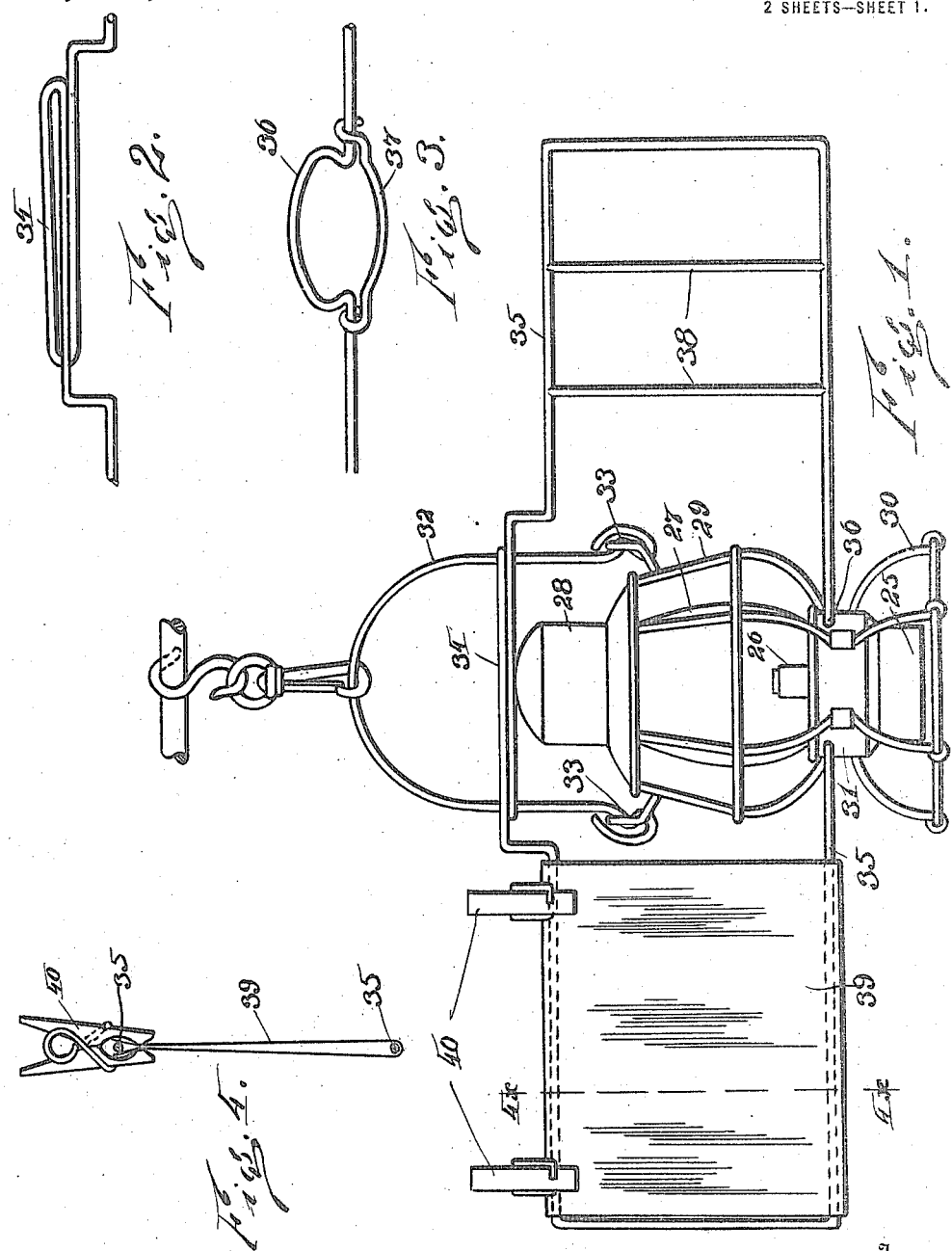

FRANK KEIPER, OF ROCHESTER, NEW YORK, ASSIGNOR OF ONE-HALF TO GEORGE R. VAN ORDEN, OF MORTON, NEW YORK.

INSECT-CATCHER.

1,263,562.  Specification of Letters Patent.  Patented Apr. 23, 1918.

Application filed June 14, 1917. Serial No. 174,771.

*To all whom it may concern:*

Be it known that I, FRANK KEIPER, a citizen of the United States, residing at Rochester, in the county of Monroe and State of New York, have invented certain new and useful Improvements in Insect-Catchers, of which the following is a specification.

The object of this invention is to provide a new and improved apparatus for killing insects.

Another object of the invention is to provide a lantern with a frame on which an adhesive may be supported for the purpose of catching and destroying insects.

Another object of the invention is to provide a frame which can be readily attached to and detached from the frame of the lantern.

These and other objects of the invention will be fully illustrated in the drawings, described in the specification and pointed out in the claims at the end thereof.

In the accompanying drawings,

Figure 1 shows a side elevation of the lantern with my improved frame attached thereto.

Fig. 2 is a detail view of the middle portion of the top of the frame.

Fig. 3 is a detail view of the middle of the bottom of the frame.

Fig. 4 is a vertical section taken on the line of 4×—4× of Fig. 1 showing the method of fastening the sticky fly paper to the frame.

In the accompanying drawings like reference numerals indicate like parts.

Figure 5:
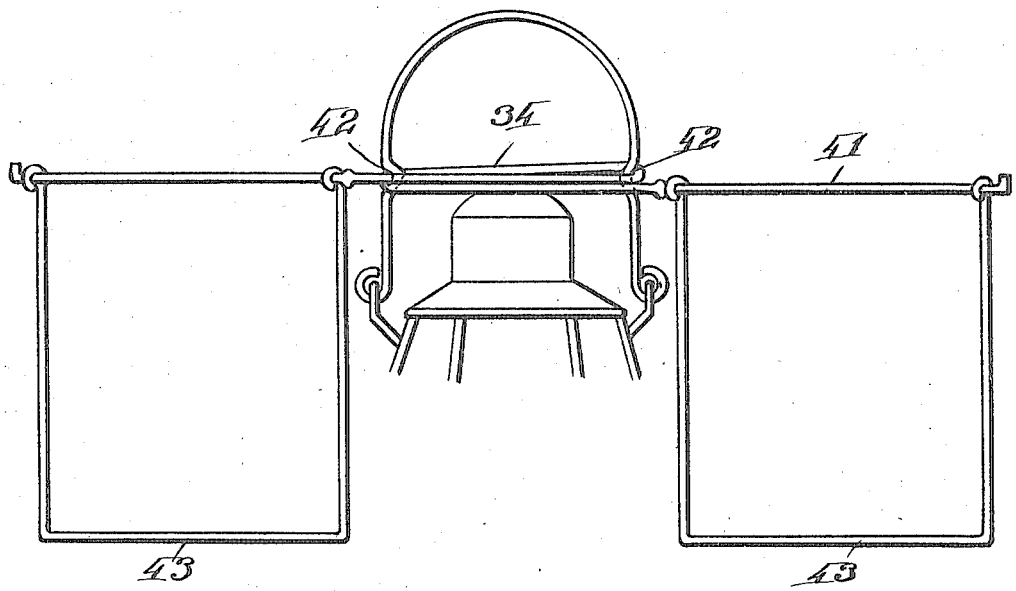
Fig. 5 is a detail view showing a modified form of my invention.

It is well known that fruit trees of all kinds and the fruit they bear suffer very greatly from the attacks of all kinds of insects.

Various measures have been devised to drive the insects away from the trees or to kill the insects and their eggs on the trees and otherwise protect the trees from these pests. Principal among these measures is the practice of spraying the trees with various kinds of solutions which usually destroy only the eggs and leave the parent insects, both male and female, free to breed more eggs and deposit them on the trees.

My invention consists of an apparatus for attracting the insects away from the trees as soon as they are capable of flying and killing them, both male and female, before they can breed and lay their eggs. The insects being induced to furnish most of the energy that destroys them.

For this purpose I provide a lantern such as is shown in Fig. 1, in which figure a railroad lantern is shown, although it will be understood that any other type of lantern may be used instead. The lantern is provided with an oil cup 25 which carries a burner 26, a glass globe or chimney 27, a top 28 and a supporting framework 29, which is expanded into a base 30 and which supports a pocket 31 in which is carried the oil cup. The lantern is provided with a handle 32, which handle is held in an upright position by the latch 33.

It will be understood that any other type of lantern may be used for this purpose, the lantern itself constituting no part of my invention, it only being necessary that it shine brightly in the dark. It should also throw its light freely in all directions and while burning oil may be used to furnish the light, it will be understood that a candle or an electric light or any source of light may be used instead.

The various forms of standard lanterns lend themselves very nicely to my invention because the framework of the lantern is convenient of form for the purpose of holding thereon the frame which constitutes the principal feature of my invention, which frame can be easily attached to and detached from the frame of the lantern as will now be described.

My invention consists more especially in a frame made of wire in which the wire is bent to form a loop 34 which positively engages the handle of the lantern or any other part thereof. The frame extends to the right and left from this loop to a suitable distance and thence down and back to the lantern. In this way a wing 35 is formed on each end of the frame and between the wings at the bottom is formed a segment 36 which comprises considerably more than a half of a circle. The inside diameter of this circle is substantially the same as or a little less than the diameter of the pocket that forms a part of the base of the lantern.

Between the top and bottom of the frame extends crossbars 38, 38 which are preferably electrically welded at their ends of the frame.

The frame is engaged with the lantern by first passing the loop 34 down over the handle till it reaches the proper position after which the bottom of the frame is swung inward until the segment 36 engages with the cylindrical part of the framework after which the segment may be forced to position thereon, it being understood that when pressure is applied, the ends of the segment will spring open until they have passed the diameter of the cylindrical part of the framework, after which they will spring back to normal position closely engaging the cylindrical part of the lantern framework and fastening the bottom of the frame in position thereon.

If desired a latch 37 may be used pivoted on the frame on one side of the segment 36, which latch engages with the frame on the other side of the segment after the segment has been put in place on the lantern. The latch completes the engagement between the frame and the lantern and makes the engagement positive so that they cannot become detached from each other as long as the latch remains engaged.

On the frame on either side of the lantern may be placed a sheet of sticky fly paper 39 or any other material coated with adhesive or sticky coating, the sheet being preferably doubled over the bottom of the frame with the sticky surface out, the ends of the sheet being brought together at the top of the frame and being fastened in place by ordinary spring clothes pins 40 as is shown at the left hand of Fig. 1 and in section Fig. 4.

As sticky fly paper is made in sheets of standard sizes, usually about 9x15.5" it is desirable to make the size of the frame to correspond. Therefore, the wings are made in length to correspond with the width of the sheets of fly paper in height to correspond with half of the length of the paper so that when a sheet of paper is doubled over one of the wings it will just about cover it.

As the central part of the frame must be made to fit the lantern and the wings must be made to fit the fly paper, it may be necessary to offset the one from the other. In Fig. 1 the wings are, therefore, shown narrower than and offset from the central part of the frame. With other dimensions of the lantern and paper, the wings would be made either of the same width as or wider than the central part of the frame.

The lantern with the frame so equipped with sticky fly paper is now ready for use, and after dark the lantern is lighted and hung from a limb of a fruit tree for the purpose of killing the flying insects that may be thereon and on the neighboring trees.

It is well known that insects of all kinds are attracted by a light at night and they will fly to the light and around it and even into a burning flame. It is sufficient for the purpose of my invention for the light to attract the insects because when the insect reaches the lantern and tries to fly around it, it will fly against one of the sticky surfaces and be caught thereon.

For this purpose the paper should be supported by the frame as nearly as possible in a position radial to the light so that it will cast little or no shadow and offer no obstruction to the rays of light that attract the insects and offer the greatest possible obstruction to the insects as they fly around the light.

As fast as one sheet of paper fills up with the insects it can be removed and another fresh sheet can be put in its place.

As shown in Fig. 5 the frame may be reduced to simpler terms. In this case it consists of the crossbar 41 having the loop 34 formed therein which engages with the handle of the lantern. To hold it against teetering of the handle, I form recesses 42, 42 in the handle in which the ends of the loop engage, it being understood that the handle has sufficient spring therein to engage with and disengage from the loop. On the ends of the bar 41 wings 43 may be mounted to swing on which the paper may be stretched. In this form the paper may swing with the wind independent of the lantern.

I claim:

1. A detachable frame for a lantern having offset portions in the central part thereof to engage with and lock itself to the framework of a lantern and having a wing thereon extending outwardly therefrom in substantially a vertical position.

2. A detachable frame for a lantern having offset portions in the central part thereof to engage with and lock itself to the framework of a lantern and having a wing thereon extending outwardly therefrom in substantially a vertical position, said wing being made of wire bent to a U-shape.

3. A lantern having a framework, a detachable frame supported in substantially a vertical position therefrom, means at the top and bottom of said frame for positively engaging said frame with the framework of said lantern and fastening it thereto, said frame extending outwardly from the lantern to form a wing, said frame and its wing being supported by the lantern, said wing extending substantially radially from the lantern.

4. A detachable frame for a lantern having a closed loop at one end thereof to engage with the lantern and means at the other end of said frame for fastening it to the lantern, said frame extending outwardly from the lantern to form a wing, said frame and its wing being supported by the lantern, said wing extending substantially radially from the lantern.

5. A detachable frame for a lantern having an open loop at one end thereof to engage with the lantern and means at the other end of said frame for fastening it to the lantern, said frame extending outwardly from the lantern to form a wing, said frame and its wing being supported by the lantern, said wing extending substantially radially from the lantern.

6. A detachable frame for a lantern having an offset portion at one end thereof to engage with and lock itself to the framework of the lantern and prevent itself from turning thereon, means to fasten itself to the framework of the lantern at the other end, said frame extending outwardly from the lantern to form a wing, said frame and its wing being supported by the lantern, said wing extending substantially radially from the lantern.

7. A detachable frame for a lantern having means thereon adapted to engage with and fasten itself to the lantern at one end by an endwise movement and means for fastening it to the lantern at the other end, said frame extending outwardly from the lantern to form a wing, said frame and its wing being supported by the lantern, said wing extending substantially radially from the lantern.

8. A detachable frame for a lantern having means thereon adapted to engage with and fasten itself to the lantern at one end by a swinging movement, and means for fastening it to the lantern at the other end, said frame extending outwardly from the lantern to form a wing, said frame and its wing being supported by the lantern, said wing extending substantially radially from the lantern.

9. A detachable frame for a lantern having means thereon by which it is fastened to the lantern by an endwise movement at one end and a swinging movement at the other end, said frame extending outwardly from the lantern to form a wing, said frame and its wing being supported by the lantern, said wing extending substantially radially from the lantern.

10. A detachable frame for a lantern having a crossbar with a loop located centrally therein, said loop being adapted to engage with the lantern, means for holding it in horizontal position thereon, said frame extending outwardly from the lantern to form a wing, said frame and its wing being supported by the lantern, said wing extending substantially radially from the lantern.

In testimony whereof I affix my signature.

FRANK KEIPER.